United States Patent
Butt et al.

[11] Patent Number: 5,889,944
[45] Date of Patent: Mar. 30, 1999

[54] COMPUTER SYSTEM HAVING CLIENT-SERVER ARCHITECTURE

[75] Inventors: John Butt, Ipswich; Paul Stuart Ireland, Colchester, both of England

[73] Assignee: British Telecommunications public limited company, London, England

[21] Appl. No.: 765,888
[22] PCT Filed: Jul. 19, 1995
[86] PCT No.: PCT/GB95/01705
 § 371 Date: Jan. 7, 1997
 § 102(e) Date: Jan. 7, 1997
[87] PCT Pub. No.: WO96/03692
 PCT Pub. Date: Feb. 8, 1996

[30] Foreign Application Priority Data

Jul. 25, 1994 [GB] United Kingdom .................. 9414951

[51] Int. Cl.⁶ .................. G06F 9/44; G06F 13/14
[52] U.S. Cl. .................. 395/200.33; 395/200.49; 395/684
[58] Field of Search .................. 395/500, 187.01, 395/188.01, 750.08, 726, 183.14, 200.32, 200.33, 684, 200.49, 200.57; 358/402, 453; 379/38, 41, 100.04; 364/DIG. 1, DIG. 2; 314/DIG. 1, DIG. 2; 707/10, 500, 502

[56] References Cited

U.S. PATENT DOCUMENTS

| | | | |
|---|---|---|---|
| 5,249,290 | 9/1993 | Heizer | 364/DIG. 1 |
| 5,325,527 | 6/1994 | Cwikowski et al. | 364/DIG. 1 |
| 5,442,730 | 8/1995 | Bigus | 395/22 |
| 5,638,511 | 6/1997 | Mezu | 395/187.01 |

FOREIGN PATENT DOCUMENTS

| | | |
|---|---|---|
| 0 384339A3 | 8/1990 | European Pat. Off. . |
| 0384339A2 | 8/1990 | European Pat. Off. . |
| 0601579A2 | 6/1994 | European Pat. Off. . |
| WO 96/03692 | 2/1996 | WIPO . |

OTHER PUBLICATIONS

Antonio Corradi et al., "Using the iAPX–432 System as Support for Chill Parallel Construts", Microprocessing and Microprogramming vol. 12, 1983, pp. 159–165.

Klemba et al. "HP Open View Network Management Architecture", Hewlett–Packard Journal, Apr. 1990, pp. 54–59.

*Primary Examiner*—Daniel H. Pan
*Attorney, Agent, or Firm*—Nixon & Vanderhye, P.C.

[57] ABSTRACT

A network manager for a telecommunications network having a client-server architecture is provided. The components of the network manager include a set of clients which form part of the application programs of the network manager, a user interface, a database containing details of the network and a communications stack for communicating with exchanges managed by the network manager. The clients generate requests to run jobs on the servers. The jobs which are run on certain servers are eventually destined for a resource in the form of a database, while the jobs which are run on other servers are eventually destined for resources in the form of exchanges. The requests are initially passed to a module JBM. This module checks if the resource for which the job is destined is free and, if not, puts the job on a holding queue. If the resource is free, it checks whether the job is scheduled for immediate execution or execution at a future time. If it is scheduled for execution at a future time, it is put on a queue of scheduled jobs. If the job is scheduled for immediate execution, the module JBM checks if a server is free to accept the job. If no server is free, the job is put on a queue of jobs awaiting immediate execution. If the server is free, the module JBM instructs a module SMAN to load the job into the free server.

13 Claims, 6 Drawing Sheets

COMPUTER SYSTEM HAVING CLIENT-SERVER ARCHITECTURE

BACKGROUND OF THE INVENTION

1. Field of the Invention

This invention relates to a computer system having a client-server architecture and also to a method of operating a computer system having this architecture.

2. Description of Related Art

A computer system having a client-server architecture comprises a set of software modules known as clients and a further set of software modules, known as servers, for serving requests from the clients to run jobs on resources accessed by the servers. This type of architecture enables jobs from the clients to be distributed among the servers. The servers may be of similar or differing types. With this type of architecture, it is desirable to provide a mechanism for controlling the scheduling of requests by the clients to run jobs on resources accessed by the servers.

An example of a computer system having a client-server architecture is shown in U.S. Pat. No. 5,325,527.

SUMMARY OF THE INVENTION

According to one aspect of this invention there is provided a computer system having a client-server architecture, said system comprising:

a set of clients;

a set of servers for serving requests from the clients to run jobs on resources accessed by the servers;

a job request manager for managing requests from the clients to run jobs on the resources; and a job loader for loading jobs onto the severs;

said job request manager being arranged to receive requests from the clients to run jobs on the resources and the operate as follows:

on receiving a request to run a job on a resource, to check if a server is free to accept the job;

if a server is free to accept the job, to instruct the job loader to load the job onto the free server;

if no server is free to accept the job, to put the job on a queue for jobs each of which is ready for execution; and when jobs are waiting on said queue and a server becomes free as a result of completion of a previous job, to select as the next job to be loaded onto a server a job which is destined for the same resource as the previous job.

According to a second aspect of this invention there is provided a method of operating a computer system having a client-server architecture, said computer system comprising a set of clients and a set of servers for serving requests from the clients to run jobs on resources accessed by the servers, said method comprising the steps of:

on receiving a request to run a job on a resource, checking if a server is free to accept the job;

if a server is free to accept the job, loading the job onto the server;

if no server is free to accept the job, putting the job on a queue for jobs each of which is ready for execution;

when jobs are waiting on said queue and a server becomes free as a result of completion of a previous job, selecting as the next job a job which is destined for the same resource as the previous job; and loading said next job onto said free server.

BRIEF DESCRIPTION OF THE DRAWINGS

This invention will now be described in more detail, by way of example, with reference to the drawings in which.

Figure 1:
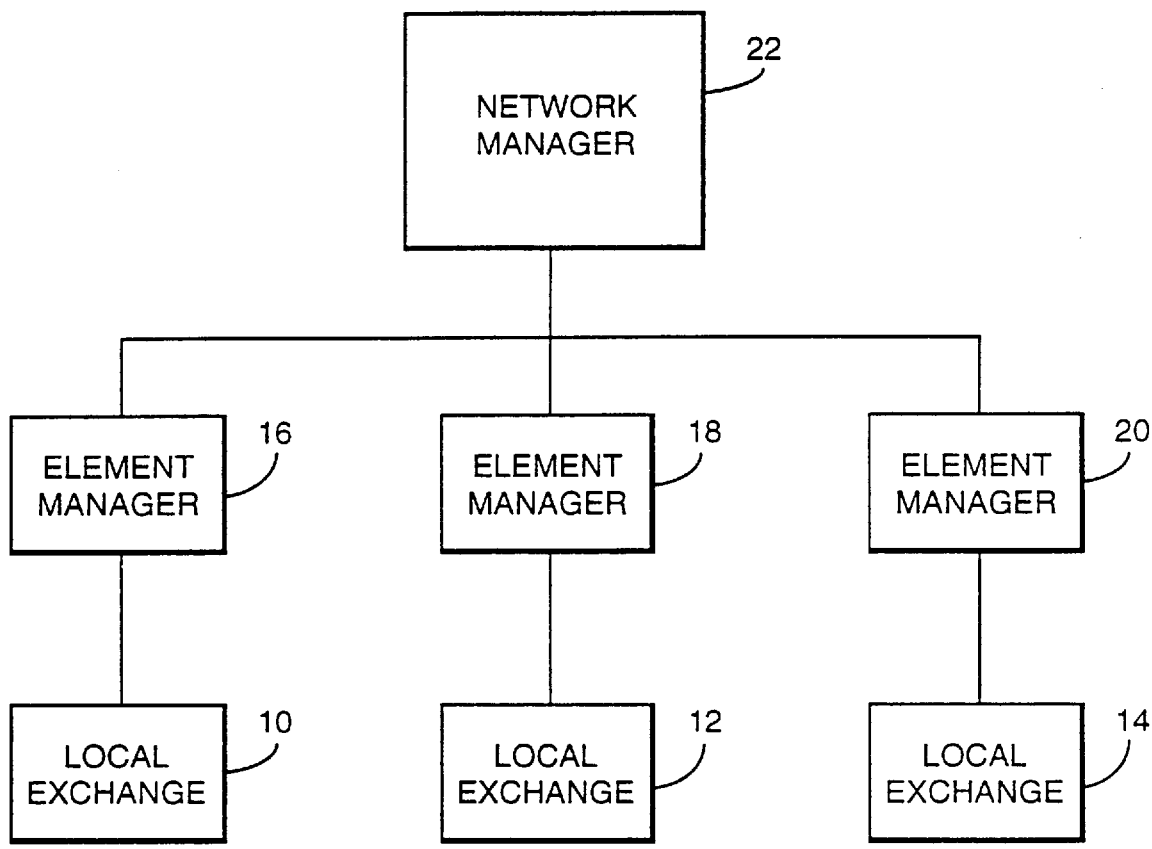
FIG. 1 is a block diagram of a network manager and associated element managers and local exchanges, the network manager including a computer system embodying this invention.
Figure 4:
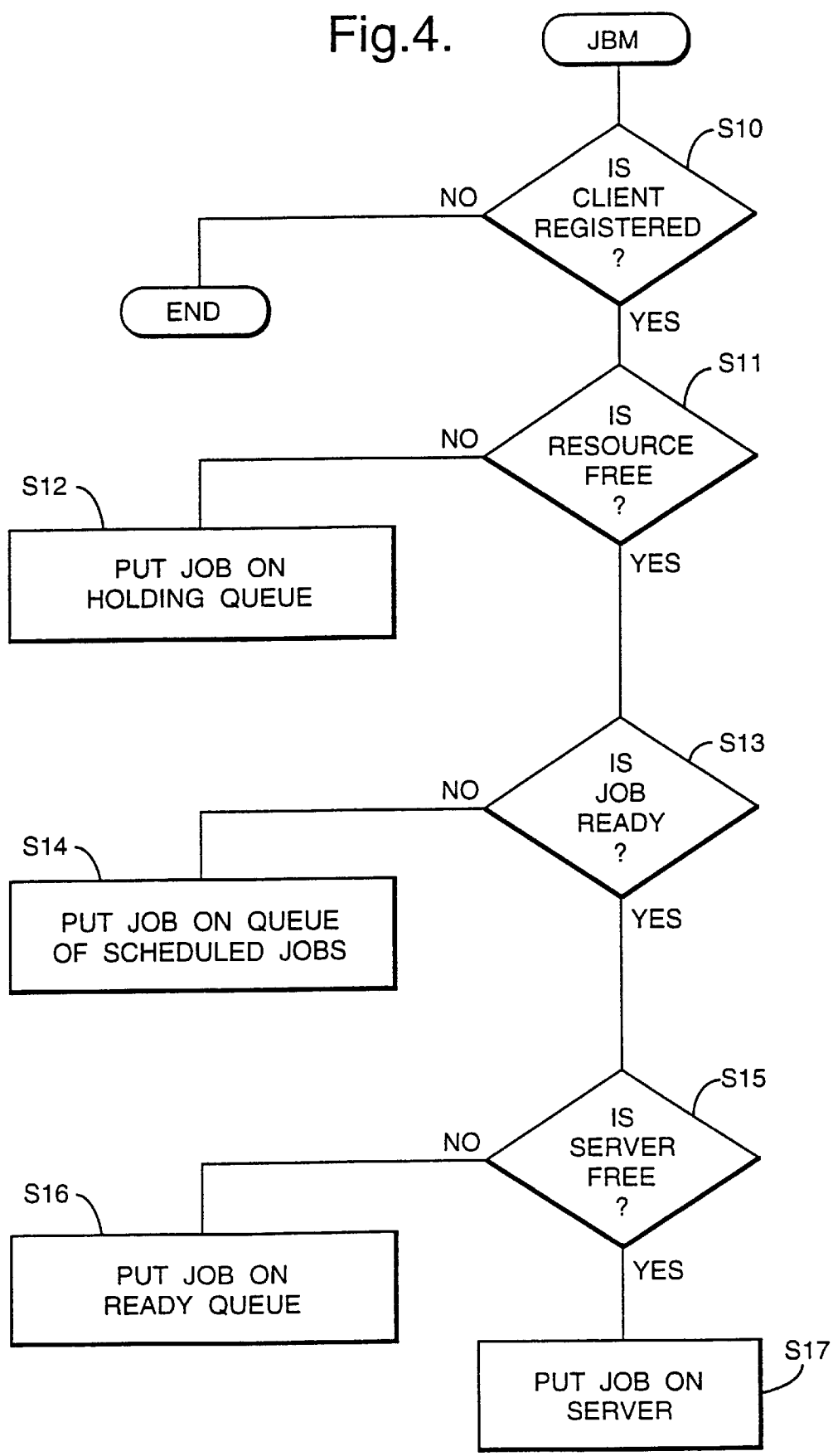
Figure 5:
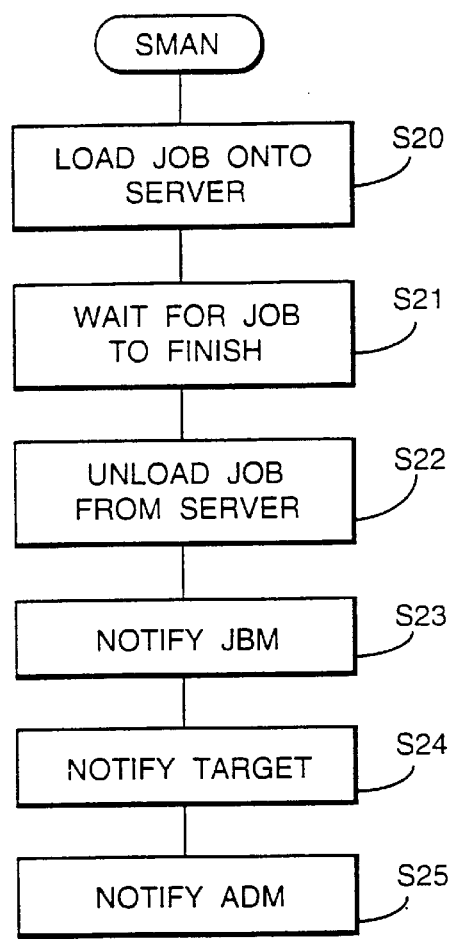
Figure 6:
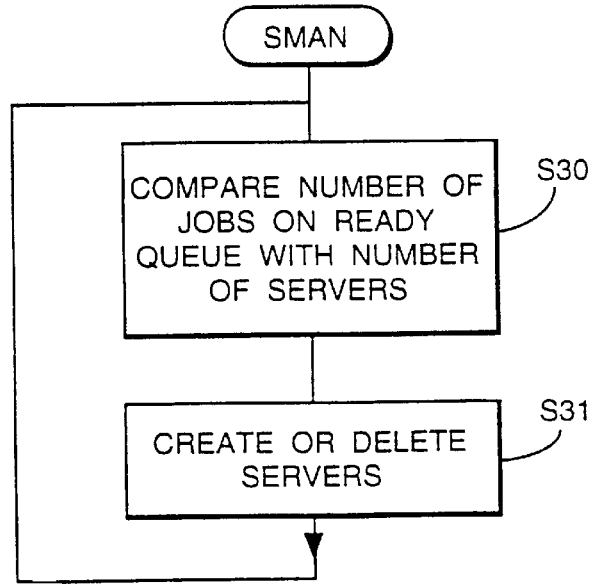
Figure 7:
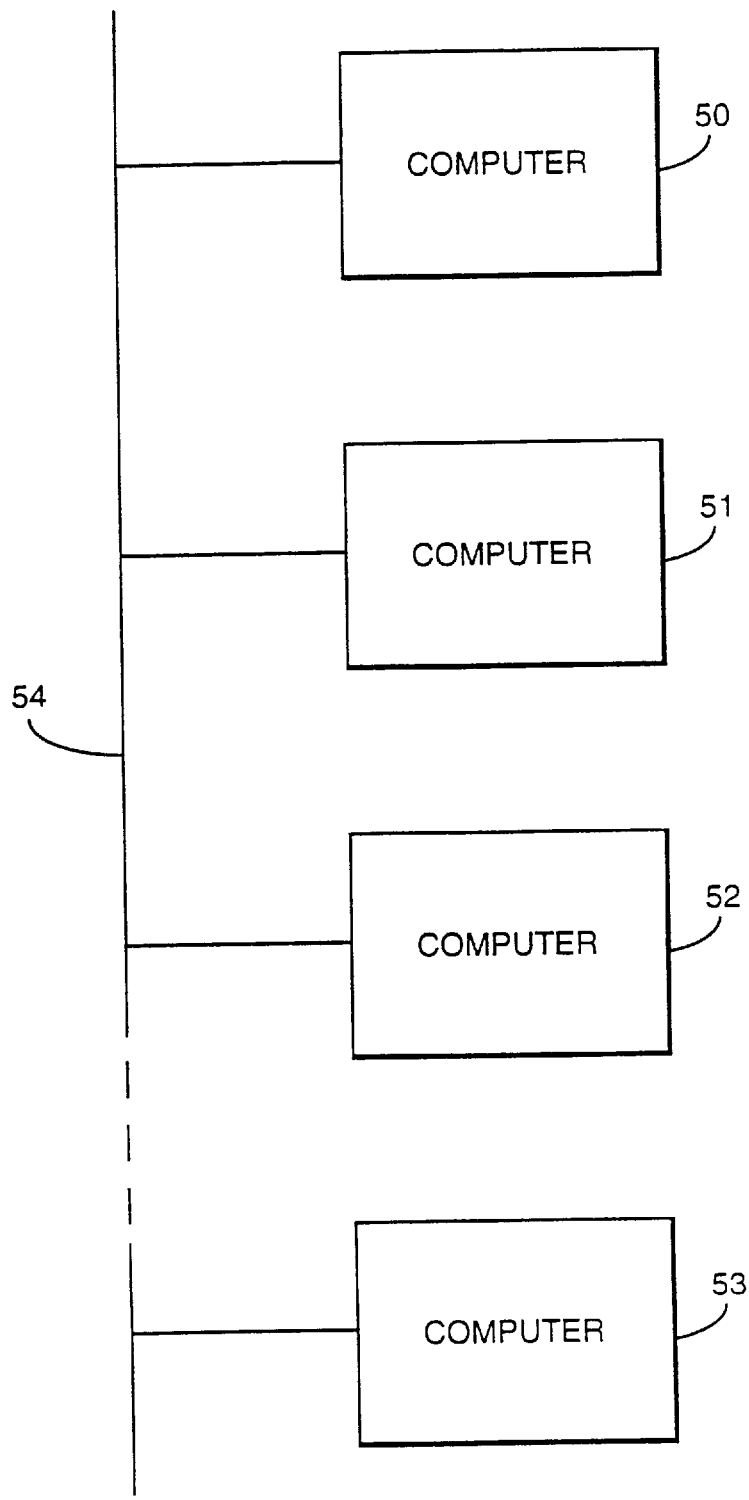
Figure 8:
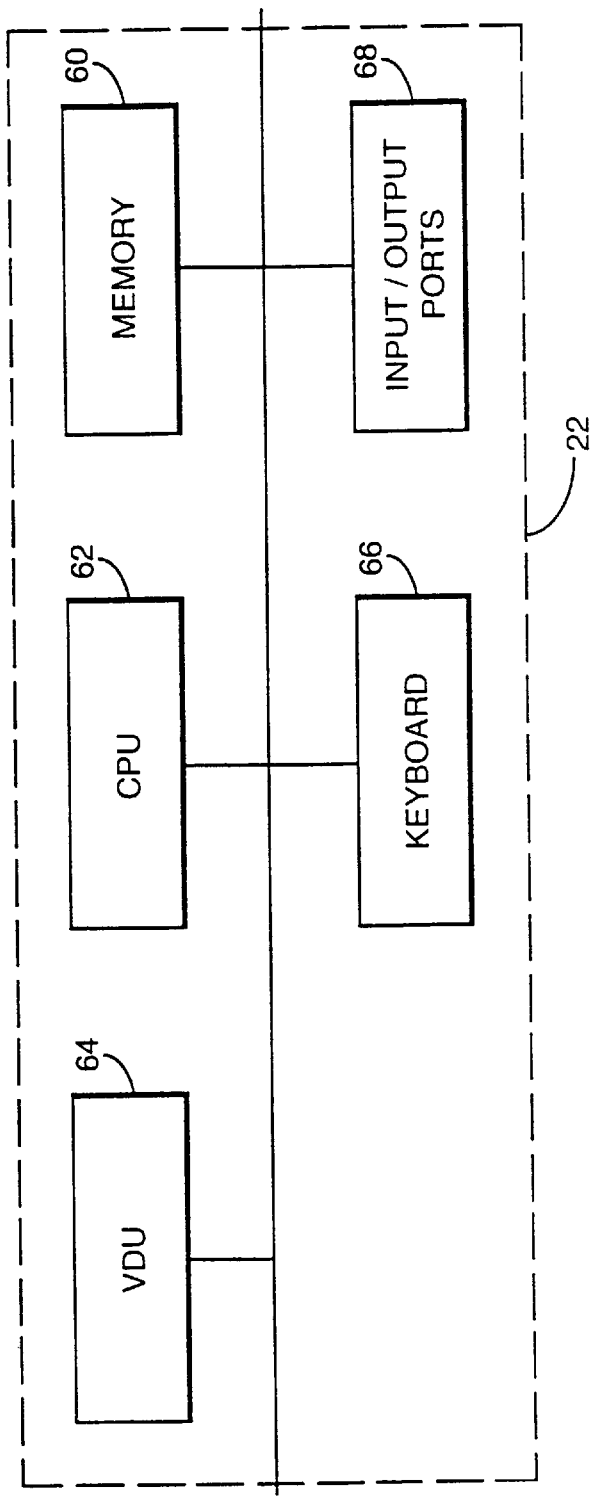

each of FIGS. 4 to 6 is a flow chart illustrating the operation of one of the modules of the transaction processing component;

FIG. 7 is a block diagram of set of computers which together form a computer system having a client-server architecture; and FIG. 8 is a block diagram of the hardware components of the network manager shown in FIG. 1.

DETAILED DESCRIPTION OF EXEMPLARY EMBODIMENTS

Referring now to FIG. 1, there are shown three local exchanges 10, 12, 14 which form part of a public telecommunications network. Although not shown in FIG. 1, the local exchanges are connected to trunk exchanges and the trunk exchanges are all fully interconnected to each other. The local exchanges 10, 12, 14 are managed, respectively, by element managers 16, 18, 20. The three element managers 16, 18, 20 are managed by a network manager 22. Although not shown in FIG. 1, each of the remaining exchanges of the network is managed by a respective individual element manager. The element managers are managed by further network managers, not shown.

Because of the complexity of an exchange, each exchange is provided with an individual element manager. By way of modification, the exchanges may be managed directly by the network manager 22 without the intermediate use of element managers. Element managers are also provided for the other elements of the network, such as multiplexers, and each of these element managers manages typically many individual elements. These further element managers are managed by one or more further network managers, not shown.

The network manager 22 sends instructions to the element managers for configuring the exchanges managed by them. The instructions sent to each element manager can include instructions to connect or disconnect customers from the local exchange as well as instructions for handling calls by that exchange. The element managers also receive data from the exchanges which they manage regarding their operating state and pass this data to the network manager 22. The network manager 22 has a database in which is stored data relating to the state of the exchanges.

The general arrangement of network manager 22, element managers and exchanges managed by the element managers as described above with reference to FIG. 1 is well known to those skilled in the art. By way of example, the local exchanges 10, 12, 14 may be System X exchanges manufactured by GEC Plessey Telecommunications p/c. The network manager 22 is implemented as a computer. The main hardware components of the computer which implements the network manager 22 are shown in FIG. 8. These comprise a store 60, a central processing unit (CPU) 62, a visual display unit (VDU) 64, a keyboard 66 and input/output ports 68. The store 60 comprises hard disc memory, random-access-memory (RAM) and read-only-memory (ROM). The software which controls the computer is stored in store 60. The software includes a client-server architecture embodying this invention. The software of the network manager 22 will now be described in more detail with special reference to the client-server architecture.

Figure 2:
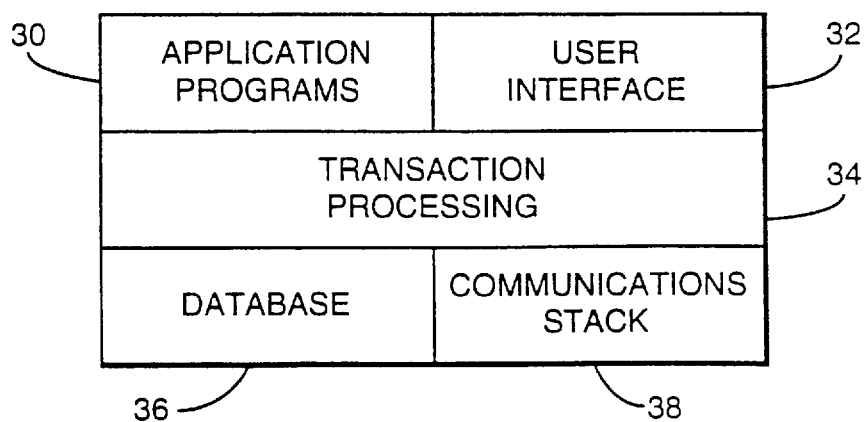
FIG. 2 is a block diagram of the main software components of the network manager of FIG. 1.

Referring now to FIG. 2, there are shown the main software components of the network manager 22. These comprise a set of application programs 30, a user interface 32, a transaction processing component 34, a database 36 and a communications stack 38. Although not shown, the components also include the operating system for the computer which implements the network manager 22.

The application programs 30 are the programs which are responsible for sending instructions to the element managers and receiving data from them. The construction of such programs for a network manager is generally well known to those skilled in the art. The user interface 32 is the software component which permits the user to access the network manager and the construction of user interfaces is also generally well known to those skilled in the art.

The database 36 is the database mentioned above which contains data relating to the operational state of the exchanges. By way of example, the database 36 may be the well known ORACLE database management system. The communications stack 38 is responsible for converting both outgoing and incoming messages between the form used by the network manager 22 and the form which is suitable for transmission along the communication links which connect the network manager 22 and the various element managers. The construction of communications stacks is generally well known to those in the art and it is now usual for a communications stack to be provided as a standard component of the operating system of a computer.

The application programs 30 generate requests for both the database 36 and the communications stack 38 to perform jobs. In the case of the database 36, the jobs take the form of either requests to enter data into the database 36 or to retrieve data from it. In the case of the communications stack 38, the jobs take the form of requests to send messages to the element managers. The transaction processing component 34 is responsible for scheduling the jobs and this, component will now be described in more detail with reference to FIG. 3.

Figure 3:
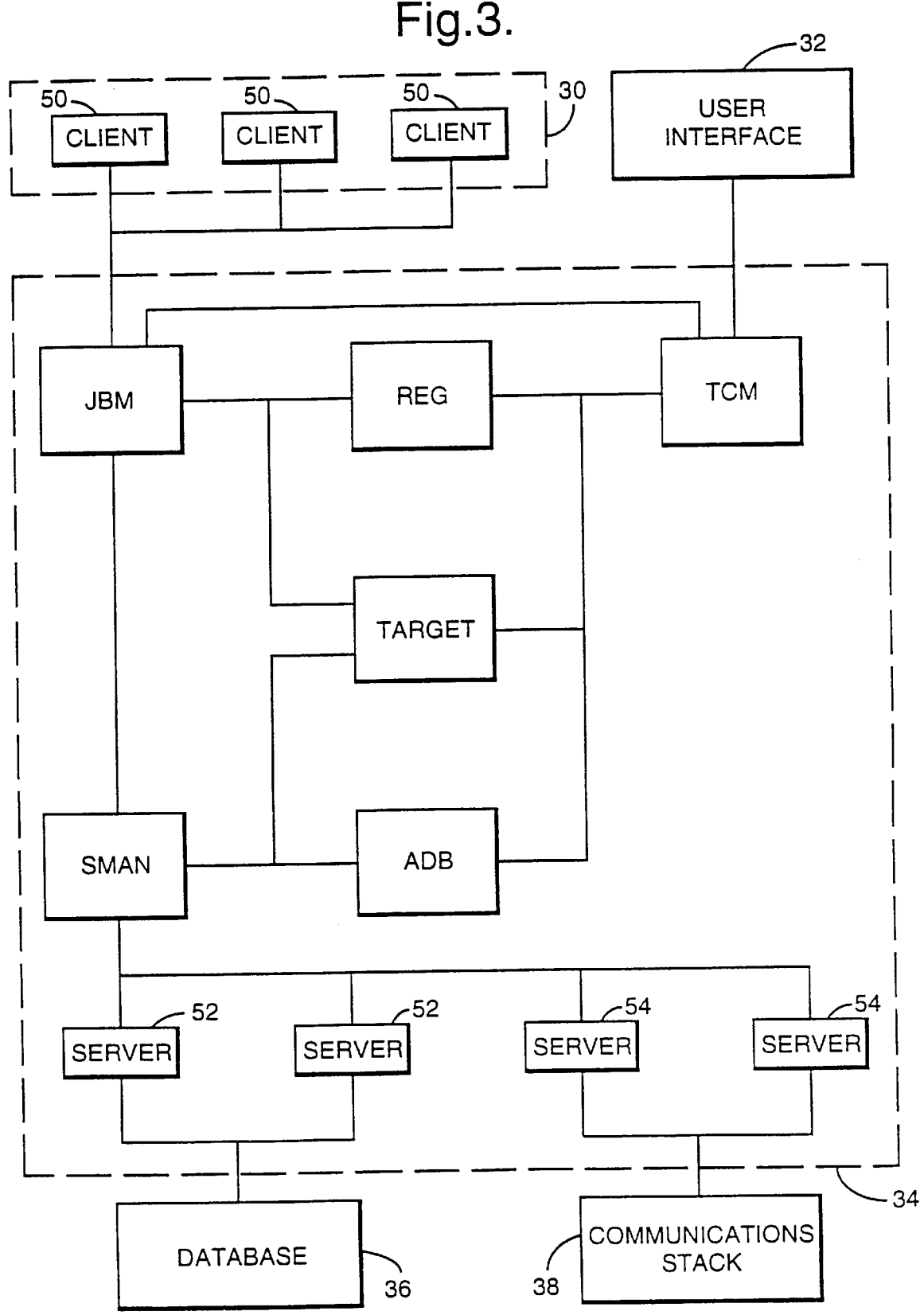
FIG. 3 is a block diagram showing the individual modules which form the transaction processing component of the network manager of FIG. 1 together with its relationship to the other software components.

Referring now to FIG. 3, there are shown the individual software modules which form the transaction processing component 34 together with the relationship of these modules to the other software components of the network manager 22. These other components comprise the user interface 32, the database 36, the communications stack 38 and a set of client modules 50. In FIG. 3, for reasons of simplicity, there are shown only three client modules 50 but, in practice, there would be a much larger number of these modules. In the present example, each of the client modules 50 is one of the application programs 30. By way of modification, the client modules could form part of the transaction processing component 34 and serve the function of interfacing to the individual application programs.

The transaction processing component 34 comprises software modules JBM, SMAN, REG, TARGET, ADB and TCM. As shown in FIG. 3, the transaction processing component 34 also has two servers 52 for accessing the database 36 and two servers 54 for accessing the communications stack 38. Thus, the servers 52 provide an interface to the database 36 and the servers 54 provide an interface to the communications stack 38. Thus, a request to run a job on one of the servers 52 also represents a request to run the job on the database 36. The communications stack 38 is part of an interface to the element managers 16, 18, 20 and, as will be recalled, these element managers manage the local exchanges 10, 12, 14. Thus, a request to run a job on one of the servers 54 represents, ultimately, a request to run the job on one of the local exchanges. Thus, database 36 and the local exchanges 10, 12, 14 represent resources accessed by the servers. The servers 52 belong to a first type of server and the servers 54 belong to a second type of server. For reasons of simplicity, only two servers are shown of each type but, in practice, there will be more than two servers of each type.

The general function of each of the software modules which form the transaction process in component 34 will now be outlined and this will be followed by a detailed description of each of these modules.

The module JBM is responsible for the management of each request received from one of the clients 50. The module JBM checks each request to see if the job can be executed immediately. If it cannot be executed immediately, it is; placed on a queue. If a job can be executed immediately, it is passed to the module SMAN which loads it on to a server. The module REG keeps a list of clients which have registered with the transaction processing component 34 and from which requests can be accepted. The module TARGET keeps account of the number of jobs running on each of the resources accessed by the servers 52, 54. The module ADB maintains details of each executed job. The module TCM provides the user with access to the modules JBM, REG, TARGET and ADB In more detail, the module JBM receives the requests to run jobs from the servers 50. The steps for processing each job request in the module JBM will now be described with reference to FIG. 4.

On receiving a request to run a job from a client, in a step S10 a check is made with the module REG to determine if the client is registered with the transaction processing component 34. The purpose of this step is to prevent jobs being run which are received by accident from clients which are not registered. If the client is not registered, processing of the job is terminated. If the client is registered, in a step S11, a check is made with the module TARGET to determine if the resource for which the job is destined is free. If the resource is not free, in a step S12, the job is placed on a queue (the holding queue) of jobs which are waiting for a resource to become free.

Some jobs are scheduled for execution at a later time. If it is found in step S11 that the resource is free, in a step S13 a check is made to determine if the job is scheduled for execution at a later time. If the job is scheduled for execution at a later time, in a step S14 it is placed on a queue (the queue of scheduled jobs) for jobs which are scheduled for execution at a later time.

If in step S13 it is found that the job is ready for immediate execution, in a step S15 a check is made with the module SMAN to determine if a server is free to run the job. For each of the two types of server, the module JBM has a queue (a ready queue) of jobs which are waiting for a server to become free. If in step S15 it is found that a server is not free to run the job, then in a step S16 the job is placed on an appropriate one of the two ready queues. If in step S15 it is found that a server is free to run the job, in a step S17, the module JBM instructs the module SMAN to load the job on to the server.

As will be explained below with reference to the module SMAN, when a job has been run on a server, it is unloaded from the server by the module SMAN and this module then informs the module JBM. The module JBM then de-queues a job from the appropriate ready queue in accordance with a predefined criterion and instructs the module SMAN to load it on to the free server. The module JBM has four predefined criteria for selecting the next job to be loaded onto a free server. By using the module TCM, the user can select, for each type of server, the particular predefined criterion to be used. These four predefined criteria will now be described.

The first predefined criterion is simply that the next job in the appropriate ready queue is selected as the next job to be loaded onto the free server.

The second predefined criterion is that the next job in the appropriate ready queue for the same resource as the previous job is selected as the next job to be loaded onto the free server. Thus, if the previous job was destined for local exchange 10, the module JBM selects the next job in the appropriate ready queue for the local exchange 10 as the next job to be loaded onto the free server. If there is no job in the appropriate ready queue for the same resource as the previous job, the next job in the ready queue is selected as the new job.

The third criterion is that the next job of the same type, regardless of the resource for which it is destined, in the appropriate ready queue is selected as the next job to be loaded onto the free server. Thus, if the previous job was to connect a new customer to a local exchange, the module JBM selects the next job for connecting a new customer to a local exchange as the next job to be loaded onto the free server. If there is no job in the ready queue of the same type as the previous job, the next job in the ready queue is selected as the next job to be loaded onto the free server.

The fourth predefined criterion is that the next job in the appropriate ready queue of the same type and destined for the same resource as the previous job is selected as the next job to be loaded onto the free server. If there is no job in the ready queue of the same type and destined for the same resource as the previous job, then the next job which is destined for the same resource as the previous job is selected as the next job to be loaded onto the free server. If there is no job in the ready queue destined for the same resource as the previous job, then the next job in the ready queue is selected as the next job to be loaded onto the free server.

In the queue of scheduled jobs, the jobs are arranged in order by their scheduled times of execution. For the job which is scheduled to be executed next, a timer is established. At the time at which the job should be scheduled, further processing of the job commences at step S13.

As will also be explained below, when a resource becomes free, the module TARGET informs the module JBM. The module JBM then removes the next job from the holding queue which is destined for the resource which has become free and processing of this job recommences with step S12.

The module JBM receives requests to run two types of jobs. In the first type of jobs (attached jobs), the client and server are connected together while the job is being run on the server. In the second type of jobs (detached jobs), the client and server are not connected while the job is run. Detached jobs have the advantage that they can be run without occupying the client. When the module JBM receives a request to run a detached job, the details of the job are stored and then retrieved when the job is unloaded from a server.

Referring now to FIG. 5, there are shown the steps which are performed by the module SMAN on receiving a request from the module JBM to load a job on to a server. After receiving a request to load a job on to a server, in a step S20, the module SMAN loads the job on to a free server. Then, in a step S21, it waits for notification from the server that the job has been completed. When it receives notification that the job has been completed, in a step S22, it unloads a job from the server. In the case of an attached job, the job is unloaded by breaking the connection between the client and the server. In the case of a detached job, the job is unloaded by transmitting the results of the job to the client from which the request came. Then, in a step S23, the module SMAN notifies the module JBM that the job has been completed and that the server has become free. In a step S24, the module SMAN notifies the module TARGET that the job has been completed. The module TARGET uses this data to keep count of the number of jobs which are being run on the relevant resource. Finally, in a step S25, the module SMAN notifies the module ADB that the job has been completed together with the details of the job. The module ADB uses this data to provide a log of completed jobs.

The module SMAN is also arranged to create and delete servers. For each type of server, the module SMAN maintains a table of the existing servers of that type together with a table containing the number jobs waiting in the ready queue for execution on that type of server. The module SMAN is arranged to maintain the number of servers of each type at an optimum level for the number of jobs which are awaiting execution. The procedure for achieving this for each ready queue in shown in FIG. 6. In a step S30, the number of jobs on the ready queue is compared with the number of servers for serving jobs on that queue. Using a criterion pre-set by the user, the comparison is used to establish if servers should be created or deleted so as to achieve the optimum number of servers. For example, the criterion could be that the ratio of the number of jobs in the ready queue to the number of servers should be kept at a certain value. Then, in a step S31, servers are created or deleted as appropriate.

As will be explained below, the user is able to instruct the module SMAN to create and delete servers.

The module REG maintains a list of clients which are registered with the transaction processing component 34. By using the module TCM, the user can add and delete clients and inspect the list. As explained above, the list of clients is accessed by the module JBM each time it receives a request to run a job from one of the clients.

For any resource, the number of jobs which can be run at any one time efficiently is limited. The database 36 is able to handle a relatively large number of jobs simultaneously. In contrast, as the main function of the local exchanges 10, 12, 14 is to process telecommunication calls, the amount of computing capacity to run jobs requested by the network manager 22 is limited and only a few of such jobs can be run simultaneously.

The function of the module TARGET is to keep a count of the number of jobs which are running on each resource and also to maintain a threshold value for the maximum number of jobs which can be run on each resource. For each resource the module TARGET maintains a list of jobs which are running on it. When the module SMAN unloads a job from a server, it notifies the module TARGET which then deletes the job from the list for the appropriate resource. As explained above, when the module JBM receives a request to run a new job, it checks with the module TARGET if the resource is free to run the job. The module TARGET then compares the number of jobs running on that resource with its threshold value and thus determines if the resource is free to accept a new job. If the resource is free to accept a new job, the module TARGET adds the job to the list for that resource and informs the module JBM that the resource can accept a new job. If the resource is not free to accept a new job, the module TARGET informs the module JBM of this.

By using the module TCM, the user can change the threshold value for each resource and also obtain a list of jobs presently running on each resource.

The module ADB maintains a database containing details of completed jobs. Each time a job is unloaded from a server the module SMAN sends details of the completed job to the module ADB and the module ADB stores these details in its database. The module ADB also maintains files containing details of jobs. At the end of each day, details of the jobs are transferred from the database to the files following a selection procedure established by the user. Thus, the database requires only limited amount of data storage capacity. By using the module TCM, the user can inspect the data in the database and in the files. Thus, the module ADB enables the user to monitor the performance of the transaction processing component 34.

The module TCM provides the user with access to the modules JBM, REG, TARGET and ADB. In the case of the module JBM, it permits the user to inspect the jobs on each queue, to delete jobs from queues and to change the scheduled times of execution for jobs on the queue of scheduled jobs. In the case of the module REG, it permits the user to add and delete clients from the list of registered client. In the case of the module TARGET, it permits the user to inspect the jobs running on each resource and also to change the threshold value for the maximum number of jobs which can be run on each resource. In the case of the module ADB, it permits the user to inspect details of the jobs stored on both the database and the files and also to change the selection procedure for transferring details of jobs from the database to the files.

Although the transaction processing component 34 has been described with reference to a network manager, it can be used in any computer system which has a client-server architecture. FIG. 7 shows a set of computers 50, 51, 52 and 53 which are connected together by a telecommunications network 54. As indicated by the dotted line, the number of computers connected in this way can be greater. Both clients and servers can be provided in any of the computers 50 to 53, thereby providing the client-server architecture. In order to control the scheduling of requests to run jobs between the clients and servers, one of the computers, for example the computer 50, is provided with a transaction processing component generally similar to the transaction processing component 34 except that it does not include servers.

We claim:

1. A computer system having a client-server architecture, said system comprising:
    a set of clients;
    a set of servers for serving requests from the clients to run jobs on resources accessed by the servers;
    a job request manager for managing requests from the clients to run jobs on the resources accessed by the servers; and
    a job loader responsive to said job request manager for loading jobs onto the servers;
    said job request manager being arranged to receive requests from the clients to run jobs on the resources and to operate as follows:
        on receiving a request to run a job on a resource, to check if a server is free to accept the job;
        if a server is free to accept the job, to instruct the job loader to load the job onto the free server;
        if no server is free to accept the job, to put the job on a queue for jobs each of which is ready for execution; and
        when jobs are waiting on said queue and a server becomes free as a result of completion of a previous job, to select as the next job to be loaded onto a server a job which is destined for the same resource as the previous job.

2. A computer system as claimed in claim 1, in which, on receiving a request to run a job, said job request manager is arranged to perform the additional following operations:
    check if the job is scheduled for execution at a time in the future; and
    if the job is scheduled for execution at a time in the future, put the job on a queue for jobs each of which is scheduled for execution at some time in the future.

3. A computer system as claimed in claim 1, in which, on receiving a request to run a job which is destined for a resource accessed by a server, said job request manager is arranged to perform the following additional operations:
    check if the resource is free to run the job; and
    if the resource is not free, put the job on a queue for jobs each of which is waiting for a resource to become free.

4. A computer system as claimed in claim 3, including a database for maintaining data on jobs running on said resources, for each resource said database keeping a count on the number of jobs being run on the resource and a threshold value representing a maximum number of jobs which said resource is capable of running.

5. A computer system as claimed in claim 4, in which, said job request manager accesses said database in order to check if a resource is free to run a job.

6. A computer system as claimed in claim 4, including means for permitting a user of the computer system to set the threshold value for each resource.

7. A computer system as claimed 1, further including means for creating and deleting servers, said server creating and deleting means being arranged to compare the number of jobs on the queue of jobs ready for execution with the number of servers for serving the jobs, and to create or delete servers in accordance with the result of the comparison.

8. A network manager for a telecommunications network, said network manager including a computer system as claimed in claim 1, and said resources including at least one exchange.

9. A method for operating a computer system having a client-server architecture, said computer system comprising a set of clients and a set of servers for serving requests from the clients to run jobs on resources accessed by the servers, said method comprising the steps of:
    on receiving a request to run a job on a resource, checking if a server is free to accept the job;
    if a server is free to accept the job, loading the job onto the server;
    if no server is free to accept the job, putting the job on a queue for jobs each of which is ready for execution;
    when jobs are waiting on said queue and a server becomes free as a result of completion of a previous job, selecting as the next job a job which is destined for the same resource as the previous job; and
    loading said next job onto said free server.

10. A method of operating a computer system as claimed in claim 9 in which, for each request to run a job on a server, said method includes the additional steps of:

checking if the job is scheduled for execution at a time in the future; and if the job is scheduled for execution at a time in the future, putting the job on a queue for jobs each of which is scheduled for execution at a time in the future.

11. A method of operating a computer system as claimed claim 9 in which, for each request to run a job which is destined for a resource accessed by a server, the method includes the following additional steps:

checking if the resource is free to run the job; and if the resource is not free, putting the job on a queue for jobs each of which is waiting for a resource to become free.

12. A computer system having a client-server architecture, said system comprising:

a set of clients;

a set of servers for serving requests from the clients to run jobs on resources accessed by the servers;

a job request manager for managing requests from the clients to run jobs on the resources; and a job loader for loading jobs onto the servers;

said job request manager being arranged to receive requests from the clients to run jobs on the resources and to operate as follows:

on receiving a request to run a job on a resource, to check if the job is scheduled for execution at a time in the future, and if the job is scheduled for execution at some time in the future, to put the job on a queue for jobs that are scheduled for execution at some time in the future, and if the job is not scheduled for execution at some time in the future, to check if a server is free to accept the job;

if a server is free to accept the job, to instruct the job loader to load the job onto the free server;

if no server is free to accept the job, to put the job on a queue for jobs each of which is ready for execution; and when jobs are waiting on said queue and a server becomes free as a result of completion of a previous job, to select as the next job to be loaded onto a server a job which is destined for the same resource as the previous job.

13. A computer system having a client-server architecture comprising:

a plurality of clients;

a plurality of servers operatively coupled to said clients to run jobs on resources accessed by the servers based on requests from said clients;

a job request manager managing said requests from said clients to run jobs on said resources; and a job loader for loading the jobs onto the servers;

wherein said job request manager is arranged to receive requests from the clients to run jobs on specified resources and on receiving the request, determining whether a server is free to accept the job;

if a server is free to accept the job, said job request manager instructing the job loader to load the job onto the free server;

if a server is not free to accept the job, said job request manager putting the job on a queue for jobs that are ready for execution; and de-queuing the jobs waiting on the queue based on the resource for which the job is destined when a server becomes free.

* * * * *